(12) United States Patent
Lin (10) Patent No.: US 8,783,171 B2
(45) Date of Patent: Jul. 22, 2014

(54) JUICE EXTRACTOR

(76) Inventor: Yi-Hsuan Lin, Kaohsiung (TW)

( * ) Notice: Subject to any disclaimer, the term of this patent is extended or adjusted under 35 U.S.C. 154(b) by 436 days.

(21) Appl. No.: 13/235,549

(22) Filed: Sep. 19, 2011

(65) Prior Publication Data

US 2012/0085248 A1 Apr. 12, 2012

(30) Foreign Application Priority Data

Oct. 6, 2010 (TW) .............................. 099219294 U (51) Int. Cl.
| | |
|---|---|
| A23J 1/00 | (2006.01) |
| B26D 1/00 | (2006.01) |
| A23N 1/00 | (2006.01) |
| A47J 19/02 | (2006.01) |

(52) U.S. Cl.
CPC *A47J 19/02* (2013.01); *A23N 1/003* (2013.01)
USPC ................... 99/501; 99/495; 99/499; 99/500; 99/502; 99/506; 99/509; 99/510; 99/504; 100/130; 100/131; 100/208; 100/213; 426/489

(58) Field of Classification Search
CPC ............ A23N 1/00; A23N 1/003; A47J 19/02
USPC ............ 99/501, 515–495; 100/213, 130–131, 100/208; 426/489, 231; 241/278.1, 278.2
See application file for complete search history.

(56) References Cited

U.S. PATENT DOCUMENTS

| | | | | |
|---|---|---|---|---|
| 19,421 | A * | 2/1858 | Helton ............................. | 100/97 |
| 562,018 | A * | 6/1896 | Nelson ........................... | 100/102 |
| 569,250 | A * | 10/1896 | Steere ......................... | 241/278.1 |
| 572,849 | A * | 12/1896 | White ............................ | 100/125 |
| 1,539,161 | A * | 5/1925 | Columbro ....................... | 100/96 |
| 1,615,734 | A * | 1/1927 | Alfisi ............................ | 100/125 |
| 2,393,475 | A * | 1/1946 | McKinnis ....................... | 99/495 |
| 2,463,125 | A * | 3/1949 | Smith et al. .................... | 100/97 |
| 2,479,194 | A * | 8/1949 | Eastman ......................... | 100/97 |
| 2,608,486 | A * | 8/1952 | Arndt ............................ | 426/489 |
| 2,715,871 | A * | 8/1955 | Dosne et al. ................... | 100/131 |
| 2,723,618 | A * | 11/1955 | Matthews et al. .............. | 100/353 |
| 3,154,122 | A * | 10/1964 | Batchelor et al. ............... | 99/504 |
| 3,329,189 | A * | 7/1967 | Batchelor ....................... | 99/504 |
| 4,937,088 | A * | 6/1990 | Gosselin et al. ............... | 426/481 |
| 5,156,872 | A * | 10/1992 | Lee ............................... | 426/489 |
| 5,170,699 | A * | 12/1992 | Senalada ........................ | 99/504 |
| 5,320,035 | A * | 6/1994 | Sanchez et al. ............... | 100/345 |

(Continued)

FOREIGN PATENT DOCUMENTS

WO     WO 02096226 A1 * 12/2002

*Primary Examiner* — Dana Ross
*Assistant Examiner* — Brett Spurlock
(74) *Attorney, Agent, or Firm* — Alan Kamrath; Kamrath IP Lawfirm, P.A.

(57) ABSTRACT

A juice extractor is adapted to squeeze juice from oranges and similar kinds of fruits. The juice extractor includes a juice extractor base and a juice squeezing wheel rotatably disposed on the juice extractor base. An arcuate concave surface is formed on an upper portion of the juice extractor base. The juice squeezing wheel has an involute outer surface. A crushing space is defined between the juice squeezing wheel and the concave surface of the juice extractor base for receiving a half-cut fruit. When the juice squeezing wheel rotates, the half-cut fruit in the crushing space is crushed to produce fruit juice. The juice extractor can squeeze juice electrically, is structurally simple and is convenient to be washed.

9 Claims, 8 Drawing Sheets

(56) References Cited

U.S. PATENT DOCUMENTS

| | | | |
|---|---|---|---|
| 5,551,335 A * | 9/1996 | McClean | 99/504 |
| 5,598,772 A * | 2/1997 | Catelli | 99/510 |
| 6,722,268 B2 * | 4/2004 | Catelli et al. | 99/510 |
| 7,252,033 B1 * | 8/2007 | Lin | 99/286 |
| 7,493,851 B2 * | 2/2009 | Mengual | 99/504 |
| 2007/0074630 A1 * | 4/2007 | Mengual | 99/495 |
| 2008/0226779 A1 * | 9/2008 | Cocchi et al. | 426/231 |

* cited by examiner

JUICE EXTRACTOR

BACKGROUND OF THE INVENTION

1. Field of the Invention

The present invention relates to a juice extractor and, more particularly, to a juice extractor which can squeeze juice from oranges and similar kinds of fruits and can be washed clean conveniently.

2. Description of the Related Art

There are large sized automatic juice extractors and small sized manual juicers available in the market for squeezing juice from oranges and similar kinds of fruits. In the practical use of a large sized juice extractor, washed oranges are put inside the machine to be cut into halves and have orange juice squeezed out automatically. The squeezing speed is fast, and the operation is effortless. The disadvantages are that the machine is large in size and occupies a large storage space and that the price of the machine is expensive. Furthermore, it is inconvenient to wash and clean components of the conventional large sized juice extractors, as well as it is difficult for the components to be washed thoroughly. Therefore, juice squeezed from the conventional large sized juice extractors is usually unhygienic. The small sized juicers are structurally simple, and the cost is cheap. However, the speed for squeezing juice is slow, and the operation requires much effort, which makes it unable to meet the requirement of providing a large amount of juice. Furthermore, it is difficult for components of the conventional small sized juicers to be washed clean. Thus, juice squeezed from the conventional small sized juicers is usually unhygienic and can cause negative effects on humans.

Therefore, what is needed is an automatic juice extractor that can be washed clean conveniently and easily and that also has the advantage of being effortless in operation.

BRIEF SUMMARY OF THE INVENTION

Thus, an objective of the present invention is to provide a juice extractor to improve the aforementioned problems. The juice extractor is adapted to squeeze juice from oranges and similar kinds of fruits, can be washed clean conveniently, and is structurally simple and effortless to use.

To achieve this and other objectives, a juice extractor of the present invention includes a juice extractor base, a rotating shaft, and a juice squeezing wheel. The juice extractor base includes upper and lower portions spaced in a vertical direction. A concave surface is formed on the upper portion of the juice extractor base and includes a front end, a rear end spaced from the front end in a first horizontal direction perpendicular to the vertical direction, and a middle section intermediate the front and rear ends. A height of the middle section of the concave surface in the vertical direction is smaller than that of the front end of the concave surface. The rotating shaft is rotatably installed above the concave surface of the juice extractor base and extends in a second horizontal direction perpendicular to the first horizontal and vertical directions. The juice squeezing wheel includes a shaft hole through which the rotating shaft extends to rotate therewith. The juice squeezing wheel further includes first and second ends spaced in a circumferential direction. An opening is defined between the first and second ends of the juice squeezing wheel. A radial distance between the first end of the juice squeezing wheel and the shaft hole is smaller than that between the second end of the juice squeezing wheel and the shaft hole. A crushing space is defined between the juice squeezing wheel and the middle section of the concave surface for receiving a fruit which needs to be squeezed. The fruit in the crushing space can be crushed by the juice squeezing wheel to produce fruit juice when the rotating shaft rotates.

In a preferred form, a radial distance between the second end of the juice squeezing wheel is slightly smaller than that between the concave surface of the juice extractor base and the shaft hole of the juice squeezing wheel. The second end of the juice squeezing wheel includes a tapered distal portion. At least one stopping protrusion is disposed on the middle section of the concave surface for positioning the fruit in the crushing space of the juice extractor base. The juice squeezing wheel further includes an outer surface extending gradually from the first end to the second end of the juice squeezing wheel to form an involute surface.

Preferably, a height of the middle section of the concave surface in the vertical direction is smaller than that of the rear end of the concave surface, and the height of the front end of the concave surface is greater than that of the rear end of the concave surface. A feeding inlet is disposed above the front end of the concave surface, so that the fruit can be placed in the crushing space of the juice extractor base from the feeding inlet. The rear end of the concave surface extends outwardly to form a recess, and a residue outlet is disposed in an outer side of the recess. A wing is protruded outwardly from the first end of the juice squeezing wheel for pushing fruit residue out from the residue outlet.

Preferably, the juice extractor base further includes first and second sides spaced in the second horizontal direction. The upper portion of the first side of the juice extractor base includes a retaining wall arranged higher than the concave surface. A juice outlet is formed in a middle of the retaining wall and in communication with the middle section of the concave surface. The rotating shaft includes inner and outer sections spaced in the second horizontal direction. The inner section of the rotating shaft is located on the second side of the juice extractor base and operably connected to a motor, and the outer section of the rotating shaft is located above the concave surface of the juice extractor base.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where.

DETAILED DESCRIPTION OF THE INVENTION

A juice extractor according to the preferred teachings of the present invention is shown in FIGS. 1 through 10 of the drawings and generally designated 10. The juice extractor 10 includes a juice extractor base 12, a rotating shaft 14, and a juice squeezing wheel 16.

The juice extractor base 12 includes upper and lower portions 18 and 20 spaced in a vertical direction Z. An arcuate concave surface 21 is formed on the upper portion 18 of the juice extractor base 12 and includes a front end 22, a rear end 24 spaced from the front end 22 in a first horizontal direction X perpendicular to the vertical direction Z, and a middle section 26 intermediate the front and rear ends 22 and 24. In this embodiment, a height of the middle section 26 in the vertical direction is smaller than that of the front end 22 and that of the rear end 24, and the height of the front end 22 is greater than that of the rear end 24. A plurality of stopping protrusions 28 is disposed on the middle section 26 of the concave surface 21. The rear end 24 extends outwardly to form a recess 30. A staircase surface 31 is formed on an inner side of the recess 30, and a residue outlet 32 is disposed in an outer side of the recess 30 (see FIG. 5). A feeding inlet 34 is disposed in the upper portion 18 of the juice extractor base 12. In this embodiment, the feeding inlet 34 is arranged above the front end 22 of the concave surface 21. A fruit 36 can be placed on the concave surface 21 from the feeding inlet 34. The juice extractor base 12 further includes first and second sides 38 and 39 spaced in a second horizontal direction Y perpendicular to the first horizontal and vertical directions X and Z. The upper portion 18 of the first side 38 of the juice extractor base 12 includes a retaining wall 37 arranged higher than the concave surface 21. A juice outlet 40 is formed in a middle of the retaining wall 37 and in communication with the middle section 26 of the concave surface 21.

The rotating shaft 14 is rotatably installed above the concave surface 21 of the juice extractor base 12. The rotating shaft 14 extends in the second horizontal direction Y and includes inner and outer sections 41 and 42 spaced in the second horizontal direction Y. The inner section 41 of the rotating shaft 14 is located at the second side 39 of the juice extractor base 12 and connected with a first gear 44 (see FIGS. 3 and 4). The first gear 44 is connected to a second gear 48 by a belt or a reduction gear unit 46. The second gear 48 is connected on an output shaft 50 of a motor 49, so that the rotating shaft 14 can be driven by the motor 49 to rotate. The outer section 42 of the rotating shaft 14 is located above the concave surface 21 of the juice extractor base 12 in the vertical direction, and at least one inclined or flat surface 51 is disposed on the outer section 42 of the rotating shaft 14.

The juice squeezing wheel 16 includes a shaft hole 52 for receiving the outer section 42 of the rotating shaft 14, such that the juice squeezing wheel 16 rotates together with the rotating shaft 14. That is, the juice squeezing wheel 16 rotates about an axis defined by the rotating shaft 14. In this embodiment, the juice squeezing wheel 16 rotates in a clockwise direction. A thread 53 is formed on a distal end of the outer section 42 of the rotating shaft 14. A nut 54 with a screw hole is locked on the distal end of the outer section 42 of the rotating shaft 14 after the juice squeezing wheel 16 is assembled with the rotating shaft 14, so that the juice squeezing wheel 16 is securely fixed on the rotating shaft 14. The juice squeezing wheel 16 further includes a cam shaped, involute outer surface 55 and first and second ends 56 and 58 spaced in a circumferential direction. An opening 60 is defined between the first and second ends 56 and 58 of the juice squeezing wheel 16. A radial distance R1 between the first end 56 and the shaft hole 52 is smaller than a radial distance R2 between the second end 58 and the shaft hole 52. In this embodiment, the outer surface 55 of the juice squeezing wheel 16 extends between the first and second ends 56 and 58 and gradually radially increases from the first end 56 to the second end 58 to form an involute contour. A wing 62 is protruded outwardly from the first end 56 of the juice squeezing wheel 16. The second end 58 of the juice squeezing wheel 16 includes a tapered distal portion 64, so that the second end 58 of the juice squeezing wheel 16 is elastically flexible.

Figure 7:
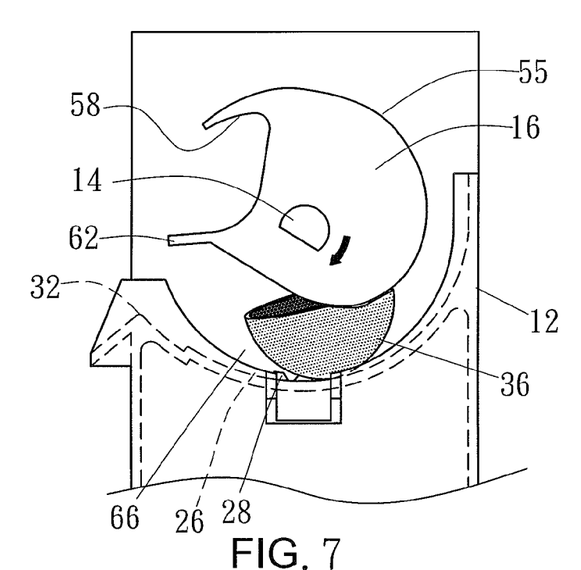
FIG. 7 is a view similar to FIG. 6, illustrating the juice squeezing wheel of FIG. 6 rotated by a certain degree and the half-cut fruit positioned in the crushing space of the juice extractor.
Figure 8:
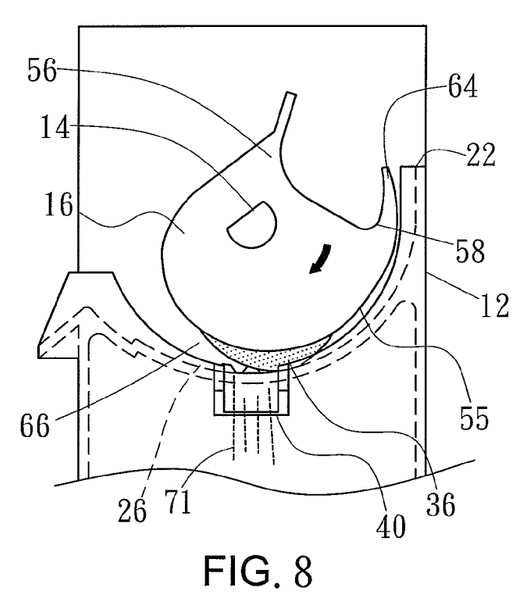
FIG. 8 is a view similar to FIG. 7, illustrating the juice squeezing wheel of FIG. 7 rotated by a certain degree and the half-cut juice squeezed by the juice squeezing wheel.

The radial distance R2 between the second end 58 of the juice squeezing wheel 16 and the shaft hole 52 is slightly smaller than a radial distance R3 between the concave surface 21 of the juice extractor base 12 and the shaft hole 52, so that a crushing space 66 is defined between the juice squeezing wheel 16 and the middle section 26 of the concave surface 21 of the juice extractor base 12 (see FIGS. 7 and 8). The crushing space 66 changes according to the position of the second end 58 of the juice squeezing wheel 16 relative to the concave surface 21 of the juice extractor base 12 when the juice squeezing wheel 16 rotates. In this embodiment, a plurality of grooves 68 is formed in the outer surface 55 of the second end 58 of the juice squeezing wheel 16. When the second end 58 of the juice squeezing wheel rotates to the middle section 26 of the concave surface 21 of the juice extractor base 12, the grooves 68 will be aligned with the stopping protrusions 28 of the concave surface 21, so that the stopping protrusions 28 do not interfere with the rotation of the juice squeezing wheel 16. The juice extractor 10 further includes a transparent cover 70 for covering on the juice squeezing wheel 16 (see FIG. 1). When the cover 70 is covered on the juice extractor 10, the residue outlet 32, the feeding inlet 34, and the juice outlet 40 are exposed outside.

Figure 1:
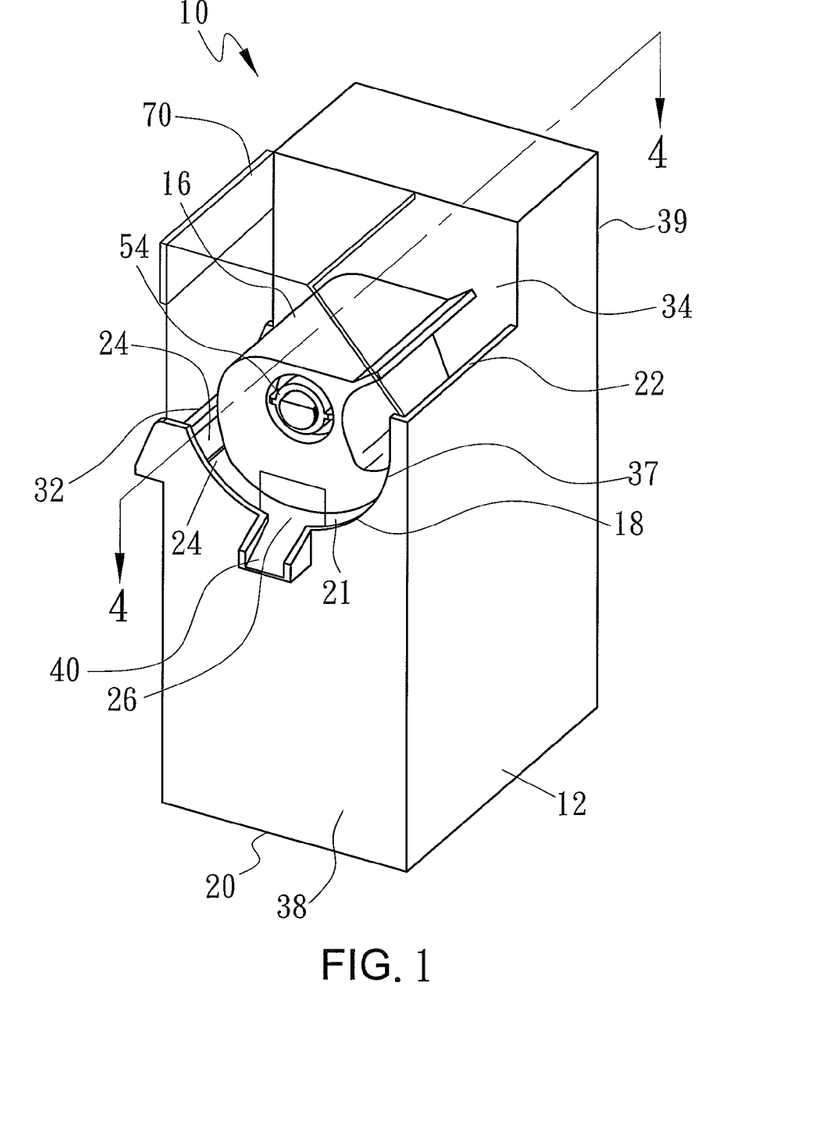
FIG. 1 is a perspective view of a juice extractor of the present invention.
Figure 2:
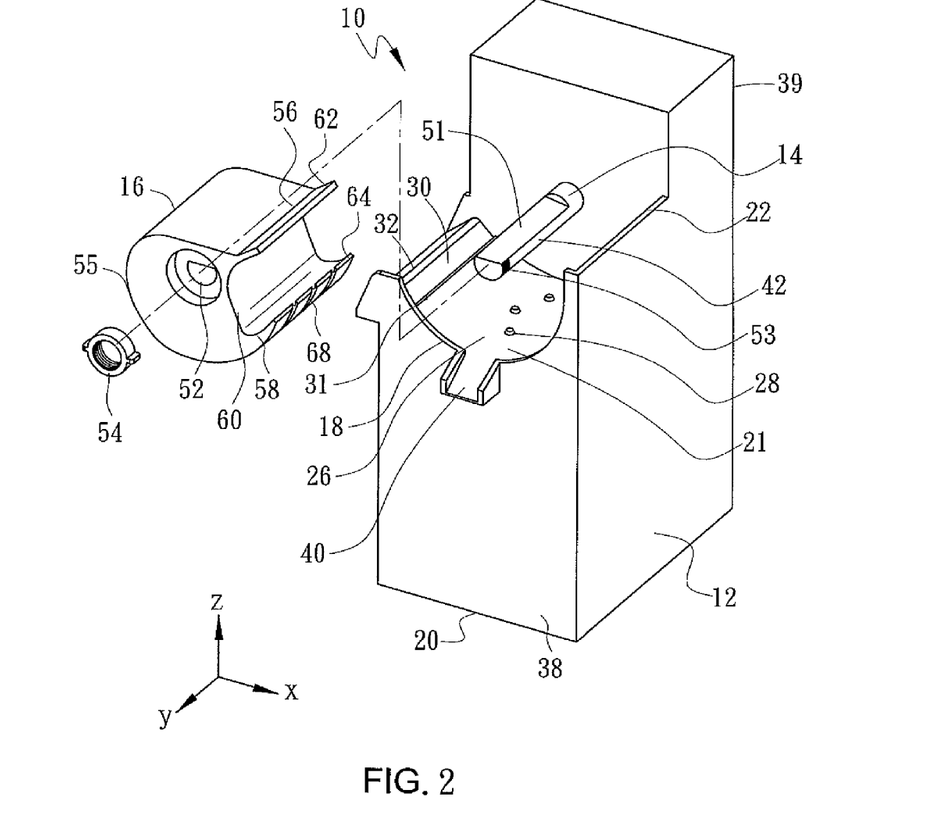
FIG. 2 is a perspective view of the juice extractor of FIG. 1 with a juice squeezing wheel dismounted and with a cover removed.
Figure 3:
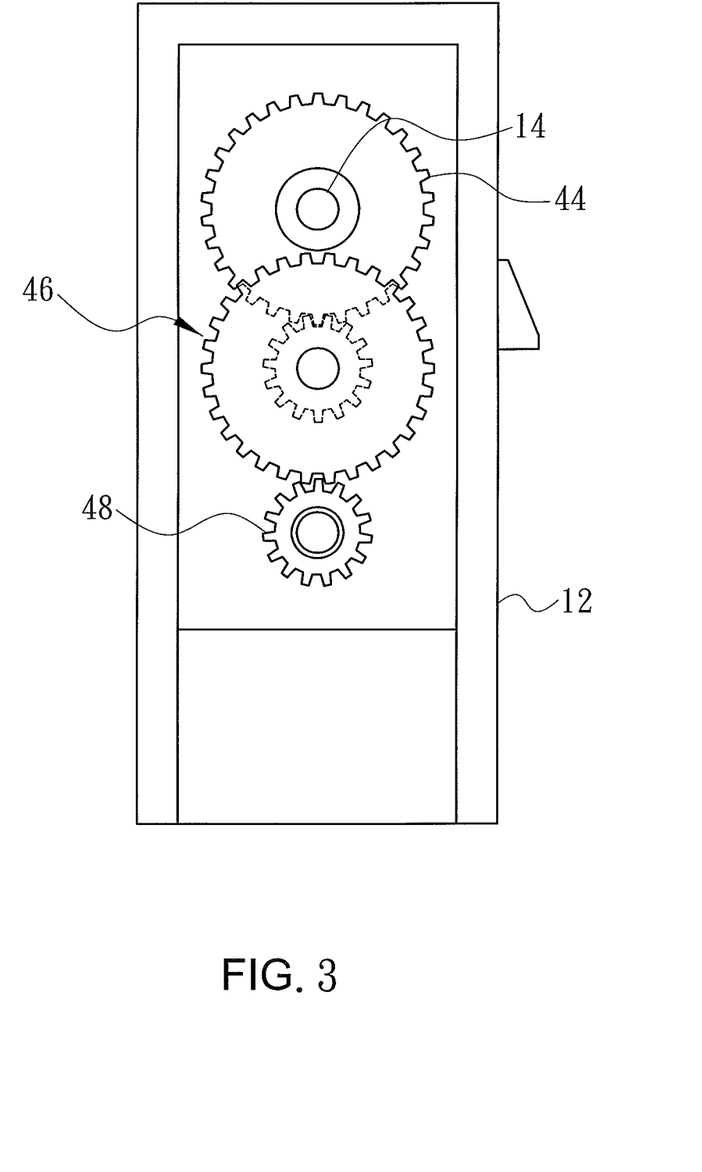
FIG. 3 shows a side plan view of a reduction gear unit of the juice extractor of FIG. 1.
Figure 4:
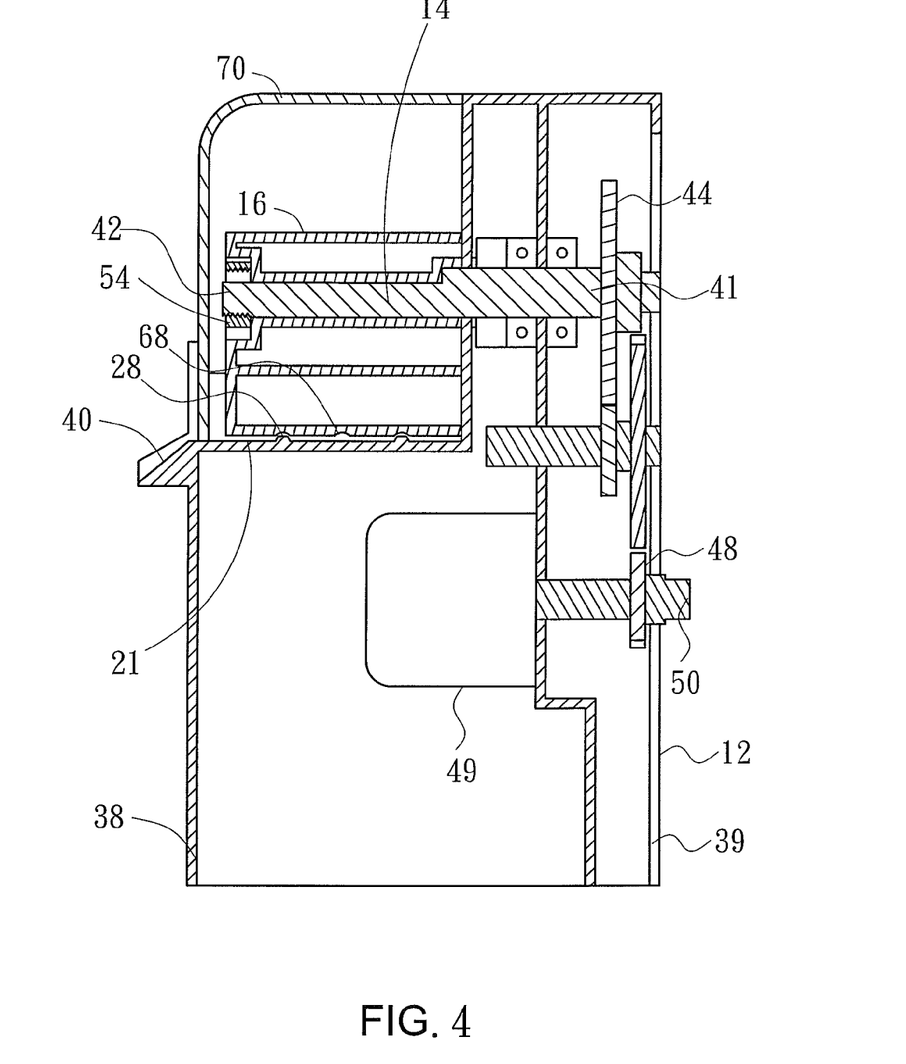
FIG. 4 is a cross-sectional view taken along plane 4-4 in FIG. 1.
Figure 5:
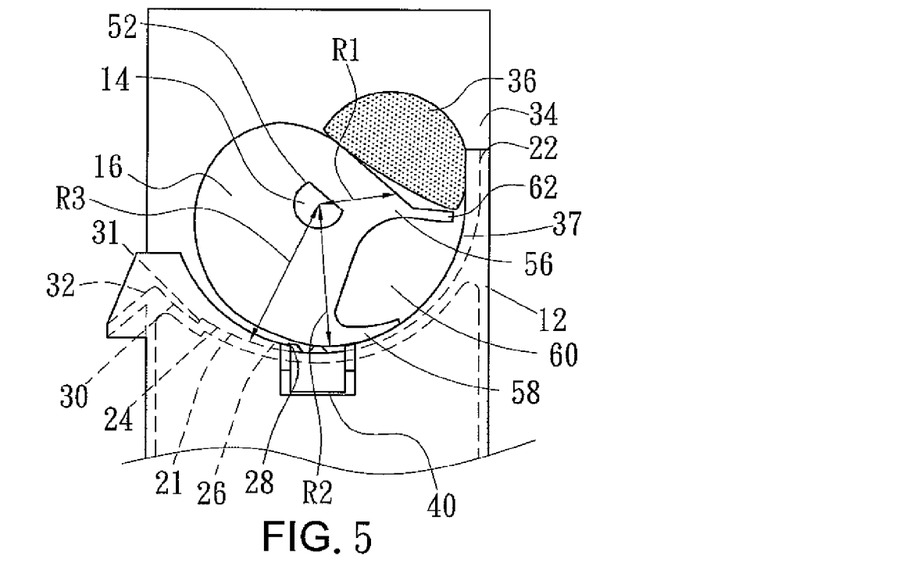
FIG. 5 is an illustration of the juice extractor of FIG. 1 in operation of fruit-crushing, with a half-cut fruit placed on a first end of the juice squeezing wheel of the juice extractor.
Figure 6:
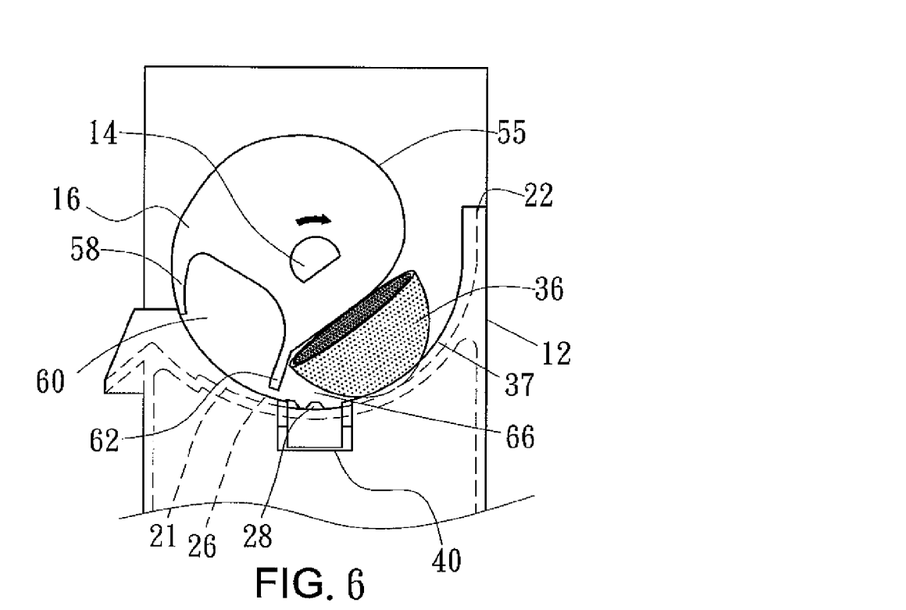
FIG. 6 is a view similar to FIG. 5, illustrating the juice squeezing wheel of FIG. 5 rotated by a certain degree and the half-cut fruit moved inside a crushing space of the juice extractor.
Figure 9:
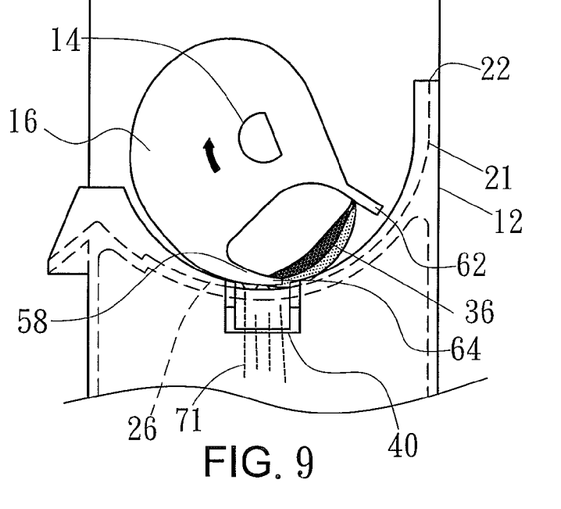
FIG. 9 is a view similar to FIG. 8, illustrating the juice squeezing wheel of FIG. 8 rotated by a certain degree and the half-cut fruit crushed by a second end of the juice squeezing wheel of the juice extractor.
Figure 10:
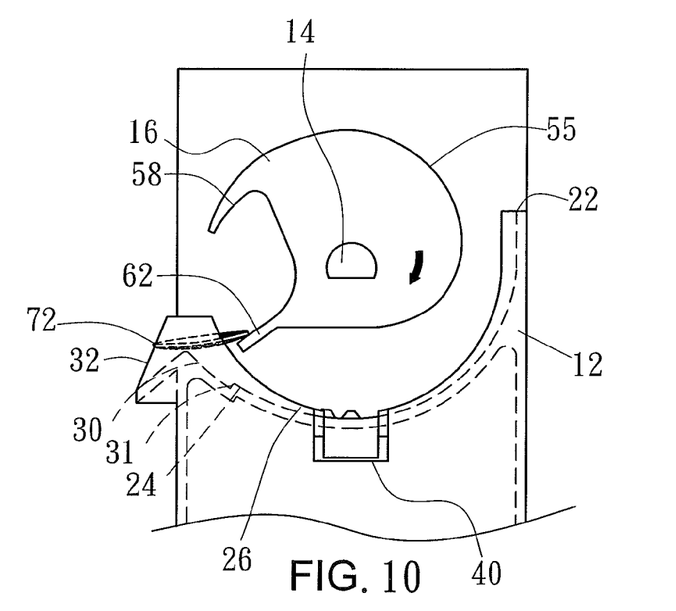
FIG. 10 is a view similar to FIG. 9, illustrating the juice squeezing wheel of FIG. 9 rotated by a certain degree and a fruit residue discharged from a residue outlet of the juice extractor.

The juice extractor 10 is structurally explained above, and its operation and effects are explained below. Referring to FIG. 5, when the juice squeezing wheel 16 rotates, and when the first end 56 of the juice squeezing wheel 16 is rotated closely to the feeding inlet 34 of the juice extractor base 12, a half-cut fruit 36 (for example an orange) to be squeezed is placed on the first end 56 of the juice squeezing wheel 16 from the feeding inlet 34, so that the half-cut fruit 36 can be fed inside the crushing space 66 by the rotation of the juice squeezing wheel 16 (see FIG. 6). Referring to FIG. 7, the half-cut fruit 36 will be stopped by the stopping protrusions 28 and positioned in the crushing space 66 when it is moved to the middle section 26 of the concave surface 21. Referring to FIGS. 7 and 8, a gap between the outer surface 55 of the juice squeezing wheel 16 and the middle section 26 of the concave surface 21 of the juice extractor base 12 becomes smaller gradually when the juice squeezing wheel 16 in FIG. 7 continues to rotate. Consequently, during the rotation of the juice squeezing wheel 16 from the front end 22 towards the rear end 24 of the concave surface 21, the outer surface 55 of the juice squeezing wheel 16 will crush the half-cut fruit 36 gradually to squeeze out fruit juice 71, and the fruit juice 71 will flow out along the juice outlet 40 into a container (not shown). Referring to FIG. 9, the juice in the half-cut fruit 36 will further be squeezed out when the half-cut fruit 36 is crushed by the second end 58 of the juice squeezing wheel 16. Even though the second end 58 of the juice squeezing wheel 16 is closed to the concave surface 21, the second end 58 of the juice squeezing wheel 16 can still squeeze out juice smoothly regardless of the thickness of the peel of the half-cut fruit 36 due to the tapered shape of the elastically flexible second end 58 of the juice squeezing wheel 16. Referring to FIG. 10, the wing 62 of the juice squeezing wheel 16 pushes the fruit residue 72 out from the residue outlet 32. When the fruit residue 72 is discharged from the residue outlet 32, it will pass through the staircase surface 31 of the recess 30, so that juice in the fruit residue 72 will remain on the staircase surface 31 and flow back to the juice outlet 40, in order to avoid a portion of the fruit juice 71 being discharged with the fruit residue 72.

The juice extractor 10 of the present invention is easy to operate and effortless to use and has the advantages of simple structure and fast speed. After the juice extractor 10 is used, the cover 70 is removed and the nut 54 is loosened to dismount the juice squeezing wheel 16 from the rotating shaft 14, allowing the juice squeezing wheel 16 to be washed clean conveniently. Further, the exterior shape of the juice squeezing wheel 16 is favorable for being washed thoroughly. Thus, juice squeezed out by the juice extractor 10 is hygienic.

Figure 11:
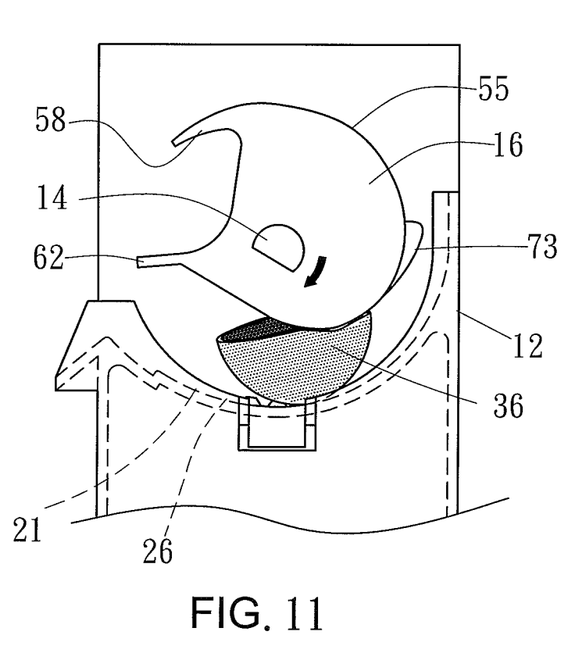
FIG. 11 is a view similar to FIG. 7, illustrating a blade disposed on the juice squeezing wheel of the juice extractor of the present invention.

Now that the basic teachings of the present invention have been explained, many extensions and variations will be obvious to one having ordinary skill in the art. The juice squeezing wheel 16 shown in FIG. 11 is a modification of that shown in FIGS. 1 through 10. A blade 73 is disposed and extends circumferentially on the outer surface 55 of the juice squeezing wheel 16. During the process which the half-cut fruit 36 is crushed by the juice squeezing wheel 16, the blade 73 can cut the crushed half-cut fruit 36, so that fruit peel oil exuded from the half-cut fruit 36 is reduced to enhance the taste of the fruit juice.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A juice extractor comprising:
a juice extractor base including upper and lower portions spaced in a vertical direction, with a concave surface formed on the upper portion of the juice extractor base and including a front end, a rear end spaced from the front end in a first horizontal direction perpendicular to the vertical direction, and a middle section intermediate the front and rear ends, with a height of the middle section of the concave surface in the vertical direction being smaller than that of the front end of the concave surface;
a rotating shaft rotatably installed above the concave surface of the juice extractor base and extending in a second horizontal direction perpendicular to the first horizontal and vertical directions; and
a juice squeezing wheel including a shaft hole, with the rotating shaft extending through the shaft hole to rotate with the juice squeezing wheel, with the juice squeezing wheel further including first and second ends extending in the second horizontal direction and spaced in a circumferential direction, with the juice squeezing wheel further including an outer surface extending between the first end and the second end, with an opening defined between the first and second ends of the juice squeezing wheel and through the juice squeezing wheel in the second horizontal direction, with a tapered distal portion extending contiguously with the outer surface from the second end towards but spaced from the first end of the juice squeezing wheel and within the opening, with the tapered distal portion having a decreasing radial thickness from the shaft hole with increasing distance from the second end of the juice squeezing wheel, with a crushing space defined between the outer surface of the juice squeezing wheel and the middle section of the concave surface of the juice extractor base for receiving a fruit which needs to be squeezed, and with the fruit in the crushing space crushed by the juice squeezing wheel to produce fruit juice when the rotating shaft rotates.

2. The juice extractor according to claim 1, with a first radial distance between the first end of the juice squeezing wheel and the shaft hole being smaller than a second radial distance between the second end of the juice squeezing wheel and the shaft hole, with the second radial distance between the second end of the juice squeezing wheel and the shaft hole being slightly smaller than a third radial distance between the concave surface of the juice extractor base and the shaft hole.

3. The juice extractor according to claim 2, with at least one stopping protrusion disposed on the middle section of the concave surface for positioning the fruit placed in the crushing space of the juice extractor base, with the juice squeezing wheel further including the outer surface extending gradually from the first end to the second end of the juice squeezing wheel to form an involute outer surface, and with the tapered distal portion and the involute outer surface including at least one circumferentially extending groove circumferentially aligned with the at least one stopping protrusion.

4. The juice extractor according to claim 3, with a height of the middle section of the concave surface in the vertical direction being smaller than that of the rear end of the concave surface, with the height of the front end of the concave surface being greater than that of the rear end of the concave surface, with a feeding inlet disposed above the front end of the concave surface with the fruit placed in the crushing space of the juice extractor base from the feeding inlet, with the rear end of the concave surface extending outwardly to form a recess, with a residue outlet disposed in an outer side of the recess, and with a wing protruded radially outwardly from the first end and the opening of the juice squeezing wheel for pushing a fruit residue out from the residue outlet.

5. The juice extractor according to claim 4, with the juice extractor base further including first and second sides spaced in the second horizontal direction, with the upper portion of the first side of the juice extractor base including a retaining wall arranged higher than the concave surface, and with a juice outlet formed in a middle of the retaining wall and in communication with the middle section of the concave surface.

6. The juice extractor according to claim 5, with the rotating shaft including inner and outer sections spaced in the second horizontal direction, with the inner section of the rotating shaft located on the second side of the juice extractor base and operably connected to a motor, and with the outer section of the rotating shaft located above the concave surface of the juice extractor base in the vertical direction.

7. The juice extractor according to claim 5, with a blade extending circumferentially on the outer surface of the juice squeezing wheel.

8. The juice extractor according to claim 2, with at least one stopping protrusion disposed on the middle section of the concave-surface for positioning the fruit placed in the crushing space of the juice extractor base, with the juice extractor base further including first and second sides spaced in the second horizontal direction, with the upper portion of the first side of the juice extractor base including a retaining wall arranged higher than the concave surface, and with a juice outlet formed in a middle of the retaining wall and in communication with the middle section of the concave surface, with the juice squeezing wheel further including the outer surface extending gradually from the first end to the second end of the juice squeezing wheel to form an involute outer surface, with the tapered distal portion and the involute outer surface including at least one circumferentially extending groove circumferentially aligned with the at least one stopping protrusion.

9. The juice extractor according to claim 8, with a feeding inlet disposed above the front end of the concave surface, with the rear end of the concave surface extending outwardly to form a recess, with a staircase surface formed on an inner side of the recess, with a residue outlet disposed in an outer side of the recess, and with a wing protruded radially outwardly from the first end and the opening of the juice squeezing wheel for pushing a fruit residue out from the residue outlet.

* * * * *